United States Patent
Grant et al.

(10) Patent No.: US 6,657,739 B1
(45) Date of Patent: Dec. 2, 2003

(54) DOUBLE-SIDED PRINTING CONFIGURATION UTILITY

(75) Inventors: John H. Grant, Ottawa (CA); Adam McKinty, Burnstown (CA)

(73) Assignee: Corel Corporation (CA)

( * ) Notice: Subject to any disclaimer, the term of this patent is extended or adjusted under 35 U.S.C. 154(b) by 0 days.

(21) Appl. No.: 09/475,632

(22) Filed: Dec. 30, 1999

(51) Int. Cl.$^7$ ............................................... G06K 15/02
(52) U.S. Cl. ..................... 358/1.12; 358/1.18; 358/498
(58) Field of Search ............................. 358/1.12, 1.18, 358/498; 399/364, 381, 388, 401; 355/53, 23, 24; 271/65, 176, 291

(56) References Cited

U.S. PATENT DOCUMENTS

| | | | |
|---|---|---|---|
| 4,879,571 A | 11/1989 | Plasscheart | 355/26 |
| 5,132,720 A | 7/1992 | Kioka et al. | 355/24 |
| 5,872,900 A * | 2/1999 | Tsuchitoi | 358/1.12 |
| 6,278,524 B1 * | 8/2001 | Kujirai et al. | 358/1.11 |
| 6,333,774 B1 * | 12/2001 | Ito et al. | 355/26 |

* cited by examiner

*Primary Examiner*—Edward Coles
*Assistant Examiner*—Alan Rahimi
(74) *Attorney, Agent, or Firm*—Hayes Soloway P.C.

(57) ABSTRACT

A printing configuration utility provides a single test sheet. The single test sheet is printed twice. The first printing has a first location mark capable of indicating orientation of the first project. The second printing has a second location mark capable of indicating orientation of the second project. After performing the first printing on the test sheet, the printing utility provides the user with instructions for reinserting the test sheet for the second printing. The printing utility asks questions to the user about the first and second printings including the relation between the first and second location marks. Based on the answers given by the user, the printing utility determines the orientation of pages when they are reinserted for the printing the second sides of the pages, and the order of processing of the second side printing.

18 Claims, 5 Drawing Sheets

| | Final Printout | First Project | Reinsertion | Print Order |
|---|---|---|---|---|
| 200 | | Face Down | Don't flip (face down) Don't rotate | Backwards |
| 201 | | Face Down | Don't flip (face down) Rotate 180 degrees | Backwards |
| 202 | | Face Down | Flip (face up) Don't rotate | Forwards |
| 203 | | Face Down | Flip (face up) Rotate 180 degrees | Forwards |
| 204 | | Face Up | Flip (face down) Don't rotate | Forwards |
| 205 | | Face Up | Flip (face down) Rotate 180 degrees | Forwards |
| 206 | | Face Up | Don't flip (face up) Don't rotate | Backwards |
| 207 | | Face Up | Don't flip (face down) Rotate 180 degrees | Backwards |

| Final Printout | First Project | Reinsertion | Print Order |
|---|---|---|---|
| 200 (1,2,3,4 face up, arrow up, 1 boxed top-left) | Face Down | Don't flip (face down) Don't rotate | Backwards |
| 201 (inverted) | Face Down | Don't flip (face down) Rotate 180 degrees | Backwards |
| 202 (1,2,3,4 on right, 2 boxed) | Face Down | Flip (face up) Don't rotate | Forwards |
| 203 (inverted on right, 3 boxed) | Face Down | Flip (face up) Rotate 180 degrees | Forwards |
| 204 (1,2,3,4 left, 1 boxed) | Face Up | Flip (face down) Don't rotate | Forwards |
| 205 (inverted left, 4 boxed) | Face Up | Flip (face down) Rotate 180 degrees | Forwards |
| 206 (1,2,3,4 right, 2 boxed) | Face Up | Don't flip (face up) Don't rotate | Backwards |
| 207 (inverted right, 3 boxed) | Face Up | Don't flip (face down) Rotate 180 degrees | Backwards |

FIGURE 8

DOUBLE-SIDED PRINTING CONFIGURATION UTILITY

This invention relates to a printing configuration utility, and more particularly, to a double-sided printing configuration utility for a single-sided printer.

BACKGROUND OF THE INVENTION

Many modern computer software programs allow the user to create double-sided projects. The vast majority of printers, however, do not provide the duplexing capability that is required to automatically print double-sided projects as part of their hardware configuration.

In order to simplify the process of printing a double-sided project on a single-sided non-duplexing printer, some software manufacturers have created double-sided printing utilities that aid the user in determining which way to manually flip and reinsert their project in order to properly orient the second side of the project on the reverse of the same sheet of paper.

FIG. 1 shows dialogues presented to the user by one of existing printing utilities, Corel Double Sided Printing Wizard ™. This printing utility leads the user through a sequence of steps involving the printing and reprinting of two test sheets and the answering of questions. Based on user's answers, the printing utility determines what type of paper-feed mechanism is used by the user's printer. This in turn allows the printing utility to provide instructions to the user, specific to the printer, as to how to properly flip and reinsert the pages in the printer for the successful printing of double-sided print jobs.

At box 2, the utility asks the user whether the user likes to enable or disable double-sided printing. When the user disables the double-sided printing, the utility asks the user at box 4 to select a printer that the user wants to disable. At box 6, the utility notifies the user of disablement of double-sided printing for the selected printer.

When the user enables double-sided printing, the utility asks the user at box 8 to select a printer that the user wants to enable. The utility prints two test pages on two test sheets at box 10. Each test page has a page indication indicating that it is a first or second page of the first printing, i.e., "A1" or "A2". Each test page also has an arrow indicating a direction of insertion for reprinting later.

The utility asks the user whether the printed side is face down at box 12. If the printed side is face down, the utility asks the user to flip both pages stacked together at box 14.

When the printed side is face up at box 12 or after the printed pages are flipped at box 14, the utility asks the user at box 16 if the top page is the first page or the second page, i.e., A1 or A2.

The utility then asks the user at box 18 to reinsert the test pages face up for reprinting. The utility performs the second printing on the test pages. The second printing has a page indication indicating that it is a first or second page of the second printing, i.e.,"B1" or "B2". The utility asks the user at box 20 to remove the test pages from the printer and answer whether the test sheets have printing on both sides.

If the test sheets have printing on both sides, the utility asks the user at box 22 to indicate the direction of the arrow. It further asks the user at box 24 to flip both test pages together horizontally, and to indicate which page the user sees, i.e., B1 or B2, and which direction the page is oriented.

If each of the test pages has printing on one side only at box 20, the utility presents pictures 30–37 representing possible printing as shown in FIG. 2. The utility asks the user at 26 to click on the picture 30–37 which matches the top page that the user sees.

Thus, the utility obtains all information necessary to configure double-sided jobs as indicated at box 28.

The problem with this scheme is that it depends on the printing of two sheets of paper, which must be flipped and/or rotated without changing their order prior to being reinserted into the printer for the second printing. For example, in FIG. 1, at box 14, the use may make an error of flipping the two test pages individually, rather than as a stack. At box 18, the user may make an error of reinserting the two test pages in a wrong order. Also, at box 24, the user may make an error of flipping the two test pages vertically, rather than horizontally. Furthermore, the entire procedure is lengthy and there are maximum of nine dialogues seen by the user after selecting the printer at box 8.

In this type of printing utilities that use two test sheets, the proper outcome of the test depends on the user's ability to correctly interpret the flipping, rotation and reinsertion instructions provided by the printing utilities. Experience has shown that this can be a very confusing task for some users. If not properly completed, it can lead to the incorrect printing of double-sided print jobs. The most commonly made mistake is for the user to individually flip the two test sheets, instead of flipping them together as a unit.

It is therefore desirable to provide a double-sided configuration utility which is capable of providing users with easy configuration procedure.

SUMMARY OF THE INVENTION

The present invention uses a printing utility that provides a single test sheet. The printing utility prints the single test sheet twice. After performing the first printing, the printing utility provides the user with instructions for reinserting the test sheet in the printer for the second printing. The printing utility asks questions to the user about the first and second printings. Based on the answers received from the user, the printing utility determines the orientation of pages when they are reinserted for printing the second sides, and the order of processing the second side printing.

In accordance with an aspect of the present invention, there is provided a printing configuration utility for configuring double-sided printing using a single-sided printer. The utility comprises a printing sub-utility, a reinsert instructing sub-utility, an information receiving sub-utility and a determining sub-utility. The printing sub-utility is provided for printing by the printer a single test sheet twice with a first project at the first printing and a second project at the second printing. The first project has a first location mark capable of indicating orientation of the first project, and the second project has a second location mark capable of indicating orientation of the second project. The reinsert instructing sub-utility is provided for instructing a user to reinsert the test sheet in the printer in a predetermined direction. The information receiving sub-utility is provided for receiving from the user printing information regarding the first and second location marks on the test sheet. The determining sub-utility is provided for determining a double-sided printing factor based on the printing information.

In accordance with another aspect of the present invention, there is provided a method for configuring double-sided printing using a single-sided printer. The method starts by printing a first project on a single test sheet. The first project has a first location mark capable of indicating orientation of the first project. A user is instructed to reinsert the test sheet in the printer in a predetermined direction. A second project is printed on the test sheet, the second project having a second location mark capable of indicating orientation of the second project. Printing information is received from the user regarding the first and second location marks on the test sheet. Then, a double-sided printing factor is determined based on the printing information.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which:

FIG. 8 is a chart showing final printouts of test sheets, reinsertion instructions and print orders of the second sides for possible cases.

DETAILED DESCRIPTION OF THE PREFERRED EMBODIMENTS

Figure 1:
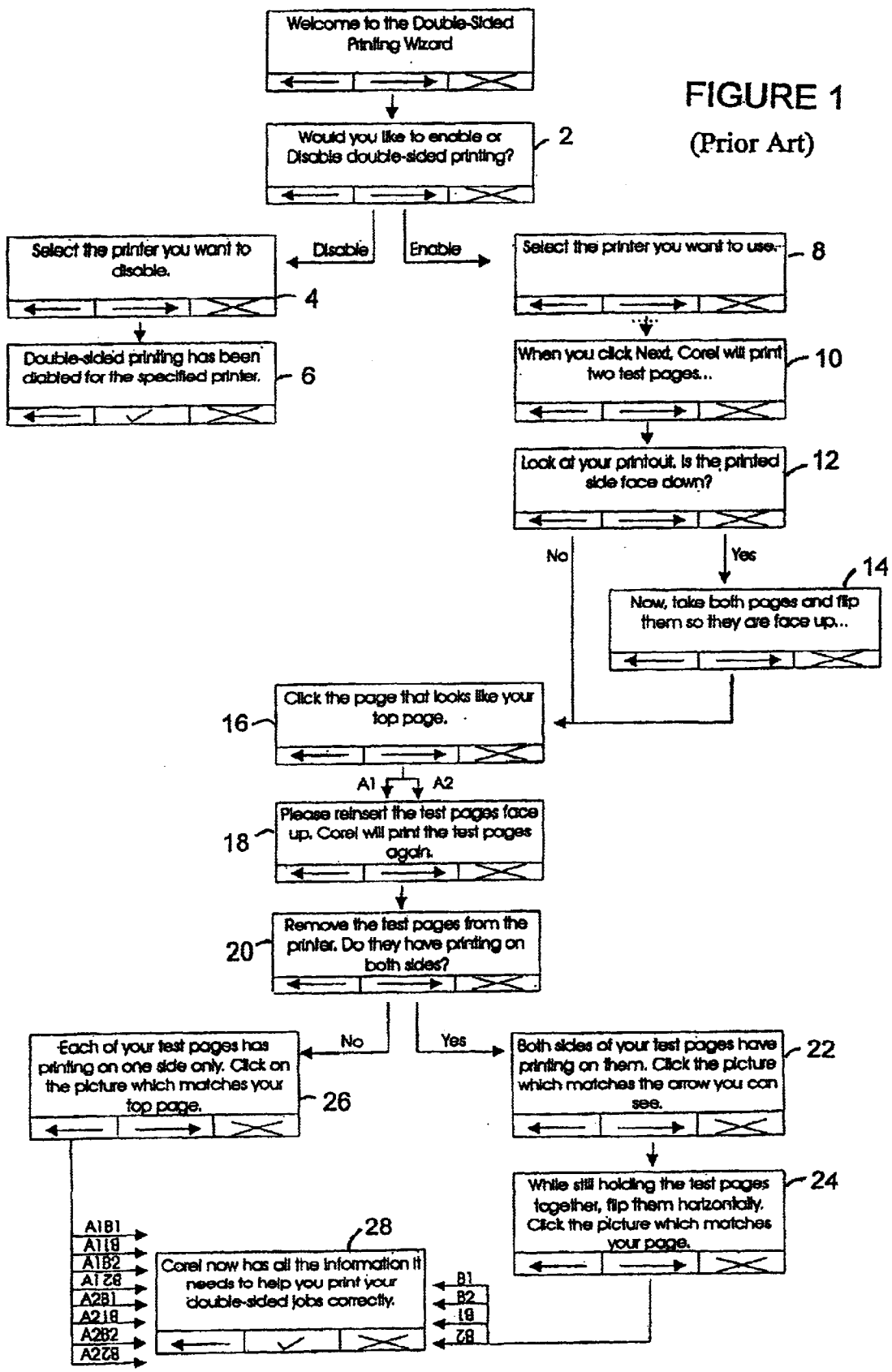
FIG. 1 is a flowchart showing an example of double-sided printing configuration of the prior art.
Figure 2:
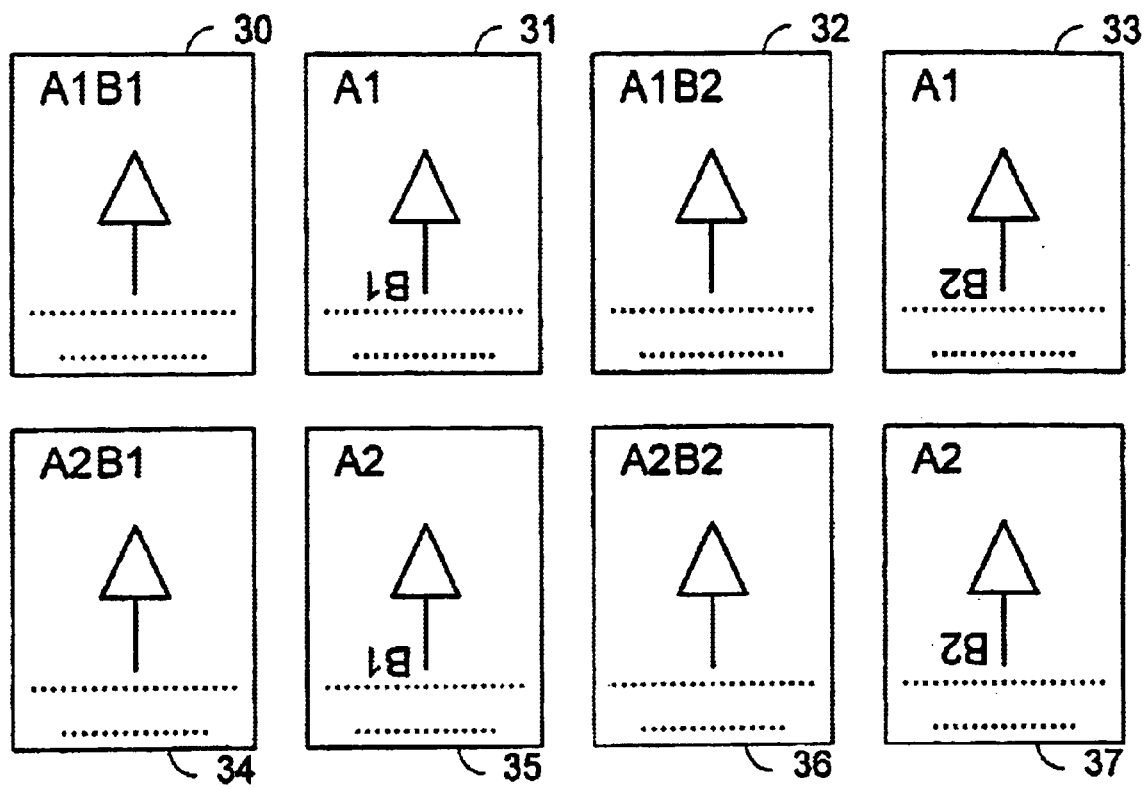
FIG. 2 is a diagram showing possible printings printed by the configuration shown in FIG. 1.
Figure 3:
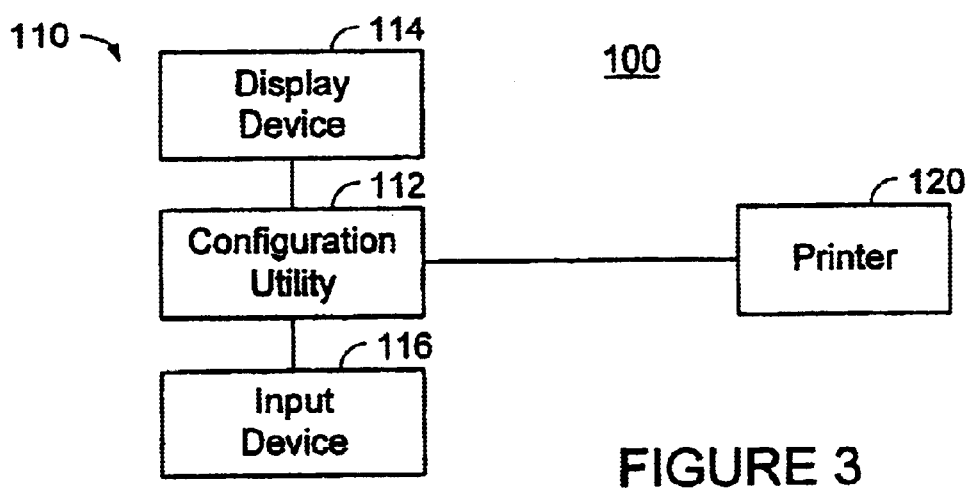
FIG. 3 is a diagram showing use of a double-sided printing configuration utility in accordance with an embodiment of the present invention.

FIG. 3 shows an example of a computer system to which a double-sided printing configuration utility in accordance with an embodiment of the present invention is suitably used.

The computer system 100 comprises a user interface terminal 110 and a printer 120.

The user interface terminal 110 includes a printing configuration utility 112, a display 114 and an input device 116. The printing configuration utility 112 provides a procedure to configure the double-sided printing using the printer 120. The display 114 displays instructions and questions presented to users by the configuration utility 112. The input device 116 is used by users to input their answers. The input device 116 may be a mouse, keyboard or any other suitable input device.

The elements of the user interface terminal 110 may be provided at a single site or at multiple sites. For example, the printing configuration utility 112 may be provided at a separate site from the display device 114 and the input device 116.

The printer 120 is a non-duplexing printer. The sheet feeding and printing mechanism of the printer is initially unknown to the configuration utility 112. Thus, in order to obtain proper double-sided printing, the system needs to know the printing order of the second sides, and the user needs to correctly orient pages when they are reinserted in the printer for printing the second sides.

The configuration utility 112 collects sheet feeding and printing mechanism data of the printer from the user by conducting a test using a single test sheet. By using a single test sheet, the confusion by users relating to manipulation of two test sheets involved in the prior art is eliminated.

Figure 4:
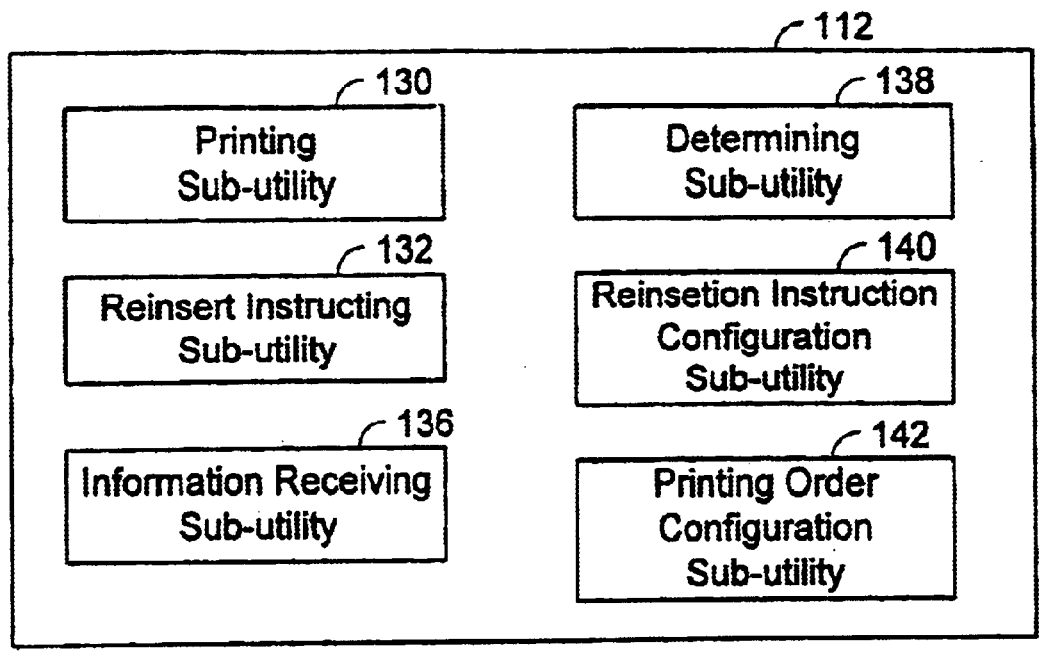
FIG. 4 is an example of the configuration utility shown in FIG. 3.

FIG. 4 shows an example of the configuration utility 112. The configuration utility 112 may include a printing sub-utility 130, a reinsert instructing sub-utility 132, an information receiving sub-utility 136 and a determining sub-utility 138.

The printing sub-utility 130 prints a single test sheet twice. It prints a first project at the first printing, and a second project at the second printing.

The first project has a first location mark. The first location mark may be provided at a predetermined location on a face of the test sheet.

The first project may also have a direction indicator. The direction indicator indicates a direction of reinsertion. It assists the user to reinsert the test sheet in a correct direction.

The reinsert instructing sub-utility 132 instructs a user to reinsert the test sheet in the printer in a predetermined direction. This direction may be provided to the user on the display device 114. However, it is preferable to use the direction indicator in the first project.

The information receiving sub-utility 136 receives from the user printing information regarding the first and second location marks on the test sheet. The printing information preferably include face up/down information, side information and location information. The face up/down information indicates whether the face of the first project is up or down when the first project is printed out. The side information indicates whether the first and second location marks are printed on the same side of the test sheet, i.e., whether the test sheet has printing on both sides. The location information indicates the relation between the first location mark and the second location mark on the test sheet.

The determining sub-utility 138 determines double-sided printing factors based on the printing information. The double sided printing factors may include a processing order factor, a flipping factor and a rotation factor. The processing order factor indicates the processing order of pages to print second sides. It is determined based on the face up/down information. The flipping factor indicates whether pages need to be flipped to print the second sides. It is determined based on the side information. The rotation factor indicates whether pages need to be rotated to print the second sides. It is determined based on the location information.

Based on the processing order factor, the flipping factor and the rotation factor, the printing configuration utility 112 can configure the printing of the second sides of pages.

In order to configure the printing of second sides, the printing configuration utility 112 may also have a reinsertion instruction configuration sub-utility 140 and a printing order configuration sub-utility 142.

The reinsertion instruction configuration sub-utility 140 configures reinsertion instructions for instructing users to flip pages in accordance with the flipping factor and to rotate the pages in accordance with the rotation factor when reinserting the pages in the printer to print the second sides of the pages.

The printing order configuration sub-utility 142 configures a printing order of the second sides of the reinserted pages in accordance with the processing order factor.

The sub-utilities shown in FIG. 4 may be implemented by using any suitable hardware or software or any combination thereof. Each sub-utility may be implemented as a separate sub-utility as shown in FIG. 4 or more than one sub-utilities may be implemented together as a single sub-utility.

Figure 5:
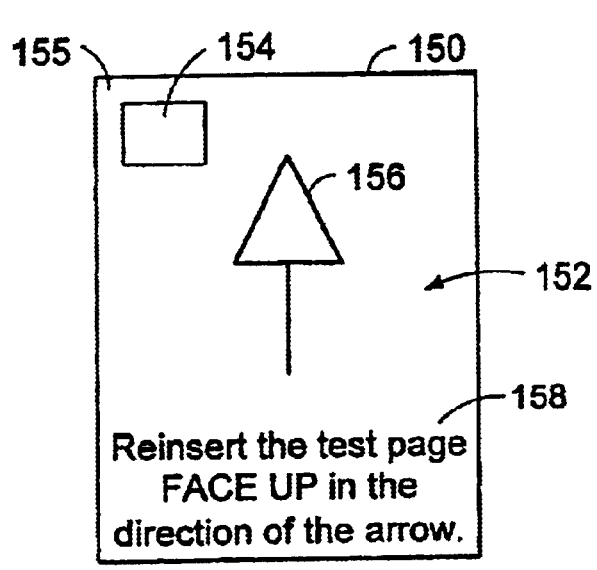
FIG. 5 is an example of a first print printed by the configuration utility.

FIG. 5 shows an example of the first project 150. The first project 150 has a direction indicator 152 and a first location mark 154.

The direction indicator 152 in this example comprises an arrow 156 and a description 158. The description indicates that the test sheet should be reinserted as the first project 150 is face up or down, depending on the configuration utility. The direction indication 152 may comprise only the arrow 156 or other symbol indicating a direction, and the user may be instructed to reinsert the test sheet face up or down by an instruction displayed on the display device 114 (FIG. 3).

The first location mark 154 may be any type of mark that is capable of indicating the orientation of the first project. In this example, the first location mark 154 is an empty square shape located at a top left corner of the test sheet. By locating the mark at a specific location other than the middle of the test sheet, the square shaped mark 154 can indicate the orientation of the first project. It is preferable to provide the first location mark 154 adjacent a corner of the test sheet as described later.

While one arrow 156 is shown in FIG. 5, the first project may have two arrows: one for indicating the longitudinal direction of the test sheet, and the other for indicating the lateral direction of the test sheet. Thus, depending on the type of feeder of the printer, the test sheet may be reinserted longitudinally or laterally.

Figure 6:
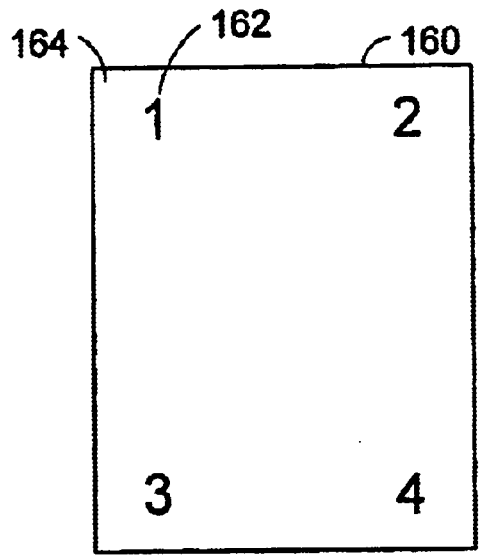
FIG. 6 is an example of a second print printed by the configuration utility.

FIG. 6 shows an example of a second project 160. The second project 160 has a second location mark 162. The second location mark 162 may be any type of mark that is capable of indicating the orientation of the second project.

The second location mark 162 may comprise any number of symbols. For example, the second location mark 162 may comprise a single symbol located at a predetermined location. It is preferable to locate the single symbol at a location which allows the user to easily find the relation between the first location mark 154 and the second location mark 162. For example, when the first location mark 154 is provided adjacent a corner 155 of the test sheet, it is preferable to locate the second location mark 162 adjacent the corresponding corner 164 to the corner 155 in which the first location mark 154 is located.

In this example, the second location mark 162 comprises four different symbols, i.e., numbers "1", "2", "3" and "4", each provided at each corner of the test sheet. The second location mark 162 consists of the four different numbers in this example. However, it may consists of alphabets or any other symbols.

By using four different symbols as the second location mark 162, the user may easily determine the relation between the first and second location marks 154, 162, as further described below.

Figure 7:
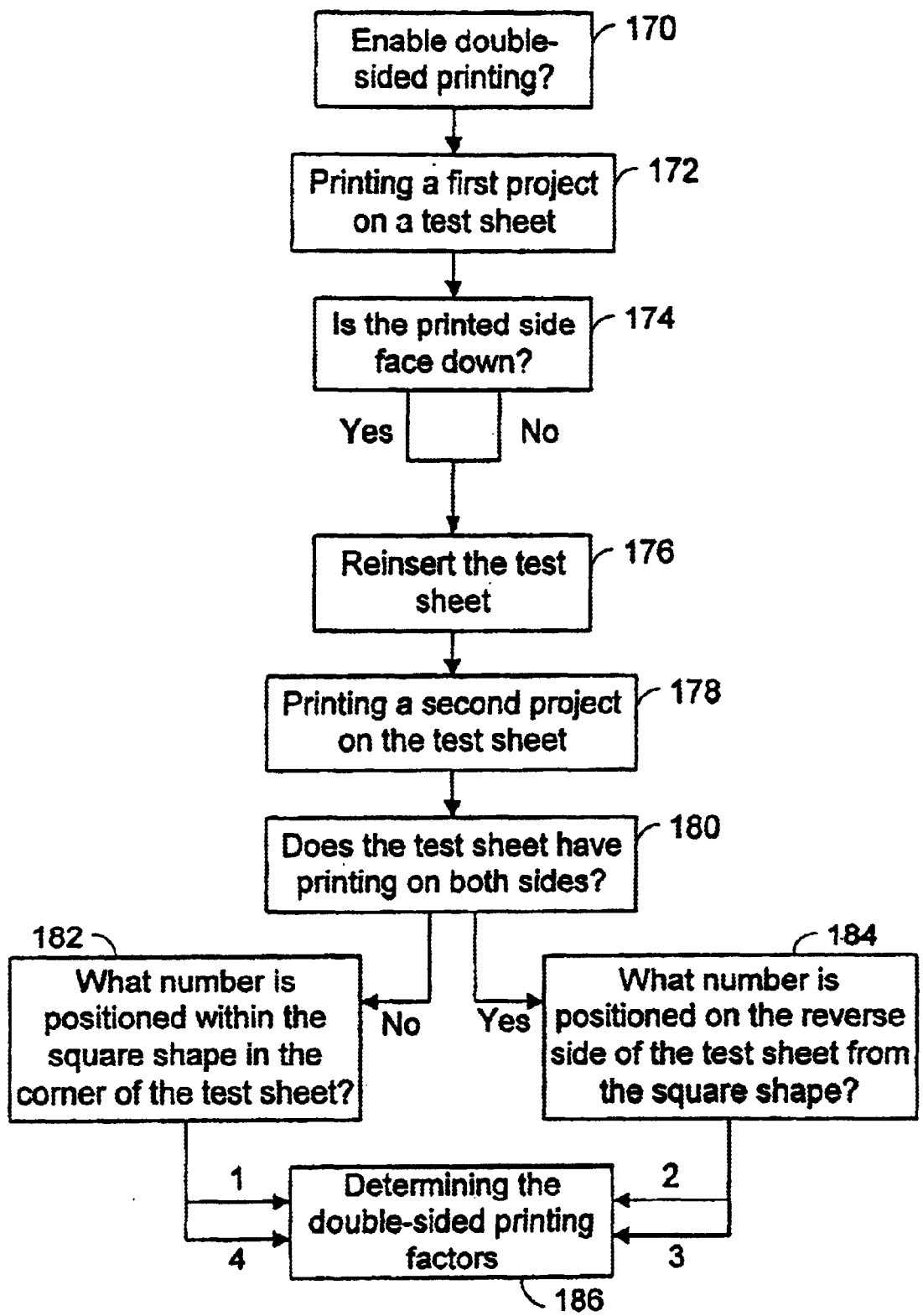
FIG. 7 is a flowchart showing an example of double-sided printing configuration carried out by the configuration utility.

FIG. 7 shows an example of the flow of the procedure carried out by the printing configuration utility 112, using the first project shown in FIG. 5 and the second project shown in FIG. 6. The flow of the procedure is shown in a form of dialogues presented to the user on the display device 114 or any other user interface. The configuration utility 112 leads the user through a sequence of procedure using a single test page. During the procedure, the user answers to questions presented by the configuration utility 112.

When the user enables double-sided printing at box 170, the configuration utility 112 prints on a single test sheet a first project as shown in FIG. 5 (box 172).

At box 174, the configuration utility 112 asks the user to indicate whether the printed side is face down. The user's answer to this question is registered as described below.

The utility asks the user to reinsert the test sheet face up in the direction of the arrow 156 (box 176). The configuration utility 112 prints on the reinserted test sheet the second project as shown in FIG. 6 (box 178). The configuration utility 112 then asks the user to indicate whether the test sheet has printing on both sides (box 180).

If the test sheet has printing on only one side, the configuration utility 112 asks to indicate the number that is positioned within the square shape in the corner of the test sheet (box 182). The answer will be either "1" or "4".

If the test sheet has printing on both sides, the configuration utility 112 asks the user to indicate the number that is positioned on the reverse side of the test sheet from the square shape (box 184). The answer will be either "2" or "3".

In response to the user's answers, the configuration utility 112 determines double-sided printing factors (box 186). That is, based on the user's answer at box 174, the configuration utility 112 determines a processing order factor indicating the order of processing of the reinserted stack of pages when the second sides of the pages are printed. Based on the user's answer at box 180, the configuration utility 112 determines a flipping factor indicating whether the pages should be flipped to print the second sides. Based on the user's answer at box 182 or 184, the configuration utility 112 determines a rotation factor indicating whether the pages should be rotated to print the second sides.

When more than one printer is used in the system, the configuration utility 112 may provide the above procedure for each printer. The configuration utility 112 may allow the user to select a printer to be configured, prior to box 172 in FIG. 7.

FIG. 8 shows possible eight final printouts 200–207. Each final printout shows a first side 211 and a second side 212.

Final printout 200 is the case where the first project is face down at box 172, the test sheet does not have printing on both sides at box 180, and the number within the square shape is "1" at box 182. In this case, the reinsertion instructions are not to flip pages to keep them face down, and not to rotate. The print order for the second sides is backwards, i.e., the printer prints the second sides from the last page to the first page.

Final printout 201 is the case where the first project is face down at box 172, the test sheet does not have printing on both sides at box 180, and the number within the square shape is "4" at box 182. In this case, the reinsertion instructions are not to flip pages to keep them face down, and to rotate pages 180 degrees. The print order for the second sides is backwards.

Final printout 202 is the case where the first project is face down at box 172, the test sheet has printing on both sides at box 180, and the number positioned on the reverse side of the test sheet from the square shape is "2" at box 184. In this case, the reinsertion instructions are to flip pages to face up, and not to rotate. The print order for the second sides is forwards, i.e., the printer prints the second sides from the first page to the last page.

Final printout 203 is the case where the first project is face down at box 172, the test sheet has printing on both sides at box 180, and the number positioned on the reverse side of the test sheet from the square shape is "3" at box 184. In this case, the reinsertion instructions are to flip pages face up, and to rotate pages 180 degrees. The print order for the second sides is forwards.

Final printout 204 is the case where the first project is face up at box 172, the test sheet does not have printing on both sides at box 180, and the number within the square shape is "1" at box 182. In this case, the reinsertion instructions are to flip pages to face down, and not to rotate. The print order for the second sides is forwards.

Final printout 205 is the case where the first project is face up at box 172, the test sheet does not have printing on both sides at box 180, and the number within the square shape is "4" at box 182. In this case, the reinsertion instructions are to flip pages face down, and to rotate pages 180 degrees. The print order for the second sides is forwards.

Final printout 206 is the case where the first project is face up at box 172, the test sheet has printing on both sides at box 180, and the number positioned on the reverse side of the test sheet from the square shape is "2" at box 184. In this case, the reinsertion instructions are not to flip pages to keep them face up, and not to rotate. The print order for the second sides is backwards.

Final printout 207 is the case where the first project is face up at box 172, the test sheet has printing on both sides at box 180, and the number positioned on the reverse side of the test sheet from the square shape is "3" at box 184. In this case, the reinsertion instructions are not to flip pages to keep them face up, and to rotate pages 180 degrees. The print order for the second sides is backwards.

The present invention may be implemented using any suitable software, hardware or any combination thereof. The software comprises computer executable code. It may be stored or carried by a medium.

The medium may be a computer readable memory, a signal transmitting medium, a transmittable signal and any other form of medium that can carry the computer executable code. The transmittable signal includes a signal carrying the computer executable code directly or indirectly on a carrier signal.

While particular embodiments of the present invention have been shown and described, changes and modifications may be made to such embodiments without departing from the true scope of the invention. For example, in the example, the first location mark comprises a single symbol and the second location mark comprises multiple symbols. However, the first location mark may comprise multiple symbols and the second location mark may comprise a single symbol, or both the first and second location marks may comprise multiple symbols. Also, the location and shape of the first and second location marks may be modified.

What is claimed is:

1. A printing configuration utility for configuring double-sided printing using a single-sided printer; the utility comprising:
    a printing sub-utility for printing by the printer a single test sheet twice with a first project at the first printing and a second project at the second printing, the first project having a first location mark capable of indicating orientation of the first project, and the second project having a second location mark capable of indicating orientation of the second project;
    a reinsert instructing sub-utility for instructing a user to reinsert the test sheet in the printer in a predetermined direction;
    an information receiving sub-utility for receiving from the user printing information regarding the first and second location marks on the test sheet; and
    a determining sub-utility for determining a double-sided printing factor based on the printing information.

2. The printing configuration utility as claimed in claim 1, wherein
    the information receiving sub-utility receives, as the printing information, side information indicating whether the first location mark and the second location mark are printed on the same side of the test sheet, and location information indicating the relation between the first location mark and the second location mark on the test sheet; and
    the determining sub-utility determines, as the double-sided printing factor, a flipping factor indicating whether pages nee to be flipped to print the second sides based on the side information, and a rotation factor indicating whether pages need to be rotated to print the second sides based on the location information.

3. The printing configuration utility as claimed in claim 2, wherein
    the information receiving sub-utility further receives, as the printing information, face up/down information indicating whether the first project comes out the printer face up or down; and
    the determining sub-utility further determines, as the double-sided printing factor, a processing order factor of pages to print the second sides based on the face up/down information.

4. The printing configuration utility as claimed in claim 1, wherein
    the first project further has a direction indicator indicating a direction of reinsertion; and
    the reinsert instructing sub-utility instructs the user to reinsert the test sheet in the printer in the direction indicated by the direction indicator.

5. The printing configuration utility as claimed in claim 1 further comprising:
    a reinsertion configuration sub-utility for configuring reinsertion instructions for instructing users to flip pages in accordance with the flipping factor and rotate the pages in accordance with the rotation factor when reinserting the pages in the printer to print the second sides on the pages; and
    a printing order configuration sub-utility for configuring a printing order of the second sides of the pages in accordance with the processing order factor.

6. A method for configuring double-sided printing using a single-sided printer; the method comprising:
    printing a first project on a single test sheet, the first project having a first location mark capable of indicating orientation of the first project;
    instructing a user to reinsert the test sheet in the printer in a predetermined direction;
    printing a second project on the test sheet, the second project having a second location mark capable of indicating orientation of the second project;
    receiving from the user printing information regarding the first and second location marks on the test sheet; and
    determining a double-sided printing factor based on the printing information.

7. The method as claimed in claim 6 wherein:
    the receiving printing information includes receiving side information indicating whether the first location mark and the second location mark are printed on the same side of the test sheet, and location information indicating the relation between the first location mark and the second location mark on the test sheet; and the determining a printing information includes determining a flipping factor indicating whether pages nee to be flipped to print the second sides based on the side information, and a rotation factor indicating whether pages need to be rotated to print the second sides based on the location information.

8. The method as claimed in claim 7, wherein the receiving printing information further includes receiving face up/down information indicating whether the first project comes out the printer face up or down; and the determining a printing information further includes determining a processing order factor of pages to print the second sides based on the face up/down information.

9. The method as claimed in claim 6, wherein the printing a single test sheet includes printing, as a part of the first project, a direction indicator indicating a direction of reinsertion; and the instructing a user includes instructing the user to reinsert the test sheet in the printer in the direction indicated by the direction indicator.

10. The method as claimed in claim 6 further comprising:

configuring reinsertion instructions for instructing users to flip pages in accordance with the flipping factor and rotate the pages in accordance with the rotation factor when reinserting the pages to print the second sides of the pages; and configuring a printing order of the second sides of the pages in accordance with the processing order factor.

11. A user interface for configuring double-sided printing using a single-sided printer, the user interface presenting to a user messages comprising:

an instruction to input face up/down information indicating whether a first project printed on a single test sheet comes out the printer face up or down, the first project having a first location mark capable of indicating orientation of the first project;

an instruction to reinsert the test sheet in the printer in a predetermined direction;

an instruction, after a second project having a second location mark is printed on the test sheet, to input side information indicating whether the first and second location marks are printed on the same side of the test sheet, the second project being capable of indicating orientation of the second project; and an instruction to input location information regarding the relation between the first location mark and the second location mark on the test sheet.

12. The user interface as claimed in claim 11, wherein the first project further includes a direction indicator indicating a direction of reinsertion; and the instruction to reinsert includes an instruction to reinsert the test sheet in the printer in the direction indicated by the direction indicator.

13. The user interface as claimed in claim 11, wherein the messages further comprises:

an instruction to flip pages, prior to reinserting the pages in the printer for printing the second sides of the pages, in accordance with a flipping factor which is determined based on the side information; and an instruction to rotate the pages, prior to reinserting the pages in the printer for printing the second sides of the pages, in accordance with a rotation factor which is determined based on the location information.

14. A medium for carrying a computer executable code for configuring double-sided printing using a single-sided printer, the computer executable code for executing the processes comprising:

printing a first project on a single test sheet, the first project having a first location mark capable of indicating orientation of the first project;

instructing a user to reinsert the test sheet in the printer in a predetermined direction;

printing a second project on the test sheet, the second project having a second location mark capable of indicating orientation of the second project;

receiving from the user printing information regarding the first and second location marks on the test sheet; and determining a double-sided printing factor based on the printing information.

15. The medium as claimed in claim 14 wherein:

the receiving printing information includes receiving side information indicating whether the first location mark and the second location mark are printed on the same side of the test sheet, and location information indicating the relation between the first location mark and the second location mark on the test sheet; and the determining a printing information includes determining a flipping factor indicating whether pages nee to be flipped to print the second sides based on the side information, and a rotation factor indicating whether pages need to be rotated to print the second sides based on the location information.

16. The medium as claimed in claim 15, wherein the receiving printing information further includes receiving face up/down information indicating whether the first project comes out the printer face up or down; and the determining a printing information further includes determining a processing order factor of pages to print the second sides based on the face up/down information.

17. The medium as claimed in claim 14, wherein the printing a single test sheet includes printing, as a part of the first project, a direction indicator indicating a direction of reinsertion; and the instructing a user includes instructing the user to reinsert the test sheet in the printer in the direction indicated by the direction indicator.

18. The medium as claimed in claim 14 further comprising:

configuring reinsertion instructions for instructing users to flip pages in accordance with the flipping factor and rotate the pages in accordance with the rotation factor when reinserting the pages to print the second sides of the pages; and configuring a printing order of the second sides of the pages in accordance with the processing order factor.

* * * * *